United States Patent Office 3,536,792
Patented Oct. 27, 1970

3,536,792
O-CYCLOHEXYL-S,S-DIARYL DITHIOPHOSPHATES
Gerhard Schrader, Wuppertal-Cronenberg, and Hans Scheinpflug, Leverkusen, Germany, assignors to Farbenfabriken Bayer Aktiengesellschaft, Leverkusen, Germany, a corporation of Germany
No Drawing. Filed Jan. 26, 1968, Ser. No. 700,702
Claims priority, application Germany, Feb. 1, 1967, 51,410
Int. Cl. C07f 9/16; A01n 9/36
U.S. Cl. 260—958                7 Claims

ABSTRACT OF THE DISCLOSURE

O-(unsubstituted and lower alkyl substituted-cyclohexyl)-S,S-bis-(unsubstituted and halo or lower alkyl substituted-phenyl)-dithiol-phosphoric acid esters which possess fungicidal properties and which may be produced by reacting the corresponding O-cyclohexyl phosphoric acid monoester dichloride with thiophenol in the form of a salt or in the presence of an acid-binding agent.

---

The present invention relates to and has for its objects the provision for particular new dithiol-phosphoric acid triesters which possess fungicidal properties, active compositions in the form of mixtures of such compounds with solid and liquid dispersible carrier vehicles, and methods for producing such compounds and for using such compounds in a new way especially for combating fungi, with other and further objects becoming apparent from a study of the within specification and accompanying examples.

French Pat. 1,378,035 discloses (thiono)dithiol-phosphoric acid diester monoamides having the general formula

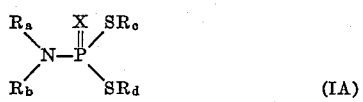

in which $R_a$ and $R_b$ may be hydrogen atoms, or alkyl or aryl radicals, $R_c$ and $R_d$ may be, among other things, aryl radicals, and X may be an oxygen or sulfur atom. According to the particulers given in this French patent, these known compounds are suitable for the control of plant pests and plant diseases.

It has been found in accordance with the present invention that the particular new dithiol-phosphoric acid triesters, i.e. O-cyclohexyl-S,S-bis-phenyl-dithiol - phosphoric acid esters having the formula

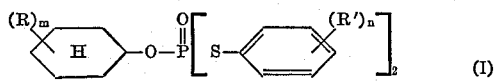

in which R is lower alkyl, R' is selected from the group consisting of halo and lower alkyl, and m and n each respectively is a whole number from 0 to 3, exhibit strong fungicidal properties.

It has been furthermore found in accordance with the present invention that a versatile and smooth process for the production of the particular new dithiol-phosphoric acid triesters of Formula I above in favorable yields and outstanding purity may be provided, which comprises reacting a phosphoric acid monoester dihalide having the formula

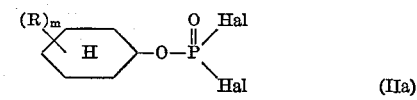

in which Hal is a halogen atom such as chloro, bromo, iodo and fluoro, especially chloro, with a thiophenol having the formula

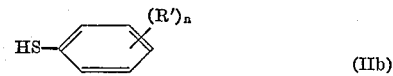

in the form of a salt or in the presence of an acid-binding agent, R, R', m and n being the same as defined above.

Advantageously, the S,S-diphenyldithiolphosphoric acid triesters of the present invention are distinguished by outstanding fungitoxic properties and, most surprisingly, are in this respect clearly superior to the compounds (of analogous constitution and the same type of activity) which are known from the above-mentioned French patent. The instant compounds therefore represent a genuine enrichment of the art.

The course of the process for producing the instant compounds is illustrated by the following reaction equation:

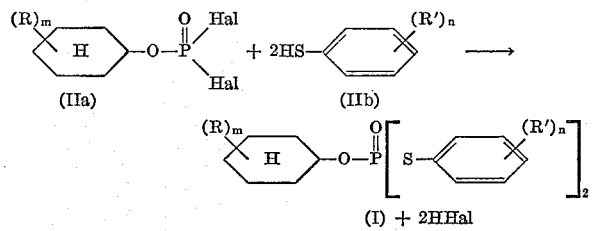

In Formulae IIa and IIb the symbols R, R', m and n are the same as defined above, Hal being a halogen atom.

As examples of the phosphoric acid monoester dihalides of Formula IIa which may be used, there may be mentioned cyclohexyl-, mono-, di- and tri-methylcyclohexyl- phosphoric acid monoester dichlorides, and the like. As thiophenols of the Formula IIb there may be mentioned for example: thiophenol, 2-, 3- and 4-chloro-, and 4-isopropyl-thiophenol, 2-, 3- and 4-thiocresol, 2-bromo-thiocresol, and the like.

The phosphoric acid monoester dihalides usable in the production process of the present invention as starting materials have already been described in the literature. They can be prepared according to known methods from the phosphorus oxyhalides by reaction with the appropriate alcohols, frequently without need for the concurrent use of acid acceptors. The crude products obtainable in this manner can in most cases be immediately further reacted according to the present invention without previous purification by distillation.

The reaction of the invention is carried out preferably in the presence of an inert solvent or diluent. Practically all inert organic solvents are suitable. Particularly good results, however, have been obtained with aliphatic and aromatic hydrocarbons (which may be chlorinated), such as methylene chloride, di-, tri- and tetra-chloroethylene, chloroform, carbon tetrachloride, benzine, benzene, chlorobenzene, toluene and xylene; ethers, for example diethyl and di-n-butyl ether, dioxan, tetrahydrofuran; aliphatic ketones and nitriles of low molecular weight, for example acetone, methylethyl ketone, methylisopropyl ketone and methylisobutyl ketone, acetonitrile and propionitrile; and low-boiling aliphatic alcohols, for example methanol, ethanol and isopropanol; and the like.

As already mentioned above, the reaction may be carried out in the presence of an acid-binding agent. For this purpose all customary acid acceptors can be used, such as alkali metal hydroxides, carbonates and alcoholates, and also tertiary organic bases, for example triethylamine, dimethylaniline, benzyldimethylamine, pyridine, and the like. Instead of working in the presence of an acid-binding agent, it is equally possible first to prepare a salt, preferably an alkali metal salt or an ammonium salt, of the thiophenol concerned and then to react this salt with the appropriate phosphoric acid monoester dihalide.

The process of the invention can be carried out successfully within a fairly wide temperature range. In general, the work is carried out at from —20° C. to the boiling point of the mixture, preferably at 0 to 100° C.

The reaction is preferably carried out under atmospheric pressure, but it is also possible to work at superatmospheric or subatmospheric pressure.

When carrying out the process according to the invention, there are used, in general, two mols of the thiophenol per mol of the phosphoric acid monoester dihalide concerned, but the former can also be used in excess.

The phosphoric acid monoester dihalide is expediently added dropwise (generally at the temperatures stated above) with stirring, to a solution (this term includes a suspension) of the thiophenol concerned (or of the appropriate thiophenolate). An external cooling of the mixture is often necessary, because the reaction is in most cases more or less strongly exothermic. Finally, it has proved expedient to continue stirring of the reaction mixture (after combining the starting materials) for a longer period (1 to 5 hours or overnight—optionally with heating) in order to complete the reaction. The products of the process are in this case obtained with particularly good yields as well as in outstanding purity.

The working up of the reaction mixture may take place according to methods known in principle by pouring out the mixture into water, washing and drying the organic phase, distilling off the solvent and—as far as is possible—fractional distillation of the residue under reduced pressure.

The dithiolphosphoric acid triesters obtainable by the instant process are either obtained in the form of crystalline compounds with sharp melting points, which can readily be further purified by recrystallization from the usual solvents, or they are colorless to yellow oils, some of which can be distilled under greatly reduced pressure without decomposition. If this is not possible, the compounds can be purified by slight distillation, that is, they can be freed from the last volatile impurities by longer heating under reduced pressure at slightly to moderately elevated temperatures.

Examples of the particular new compounds of the present invention which can be obtained include O-cyclohexyl-S,S-diphenyl-, -S,S-bis-(2- or 4-methylphenyl)-, -S,S-bis-(4-chlorophenyl)-, -S,S-bis-(2,4- or 3,4-dichlorophenyl)-, -S,S-(2,4,5- or 3,4,5- or 2,4,6-trichlorophenyl)-, etc., dithiolphosphoric acid esters as well as the corresponding O-(2- or 3- or 4-methylcyclohexyl-) and O-(1,1-, 1,2-, 1,3- and 1,4-dimethylcyclohexyl) derivatives, as well as the corresponding O-trimethylcyclohexyl-S,S-diphenyl-dithiolphosphoric acid esters; and the like.

As already mentioned, the instant compounds have a strong fungitoxic effectiveness against a series of fungal pathogenic agents. By reason of this fact and their low toxicity to warm-blooded animals they are particularly suitable for the control of undesired growth of fungi, their good compatibility with higher plants favoring particularly their use against fungal diseases. Thus, the instant compounds can be used as fungitoxic agents in plant protection against fungi of the most widely different classes, for example Archimycetes, Phycomycetes, Ascomycetes, Basidiomycetes, Fungi imperfecti, and the like.

The instant compounds have, however, given particularly good results in the control of rice diseases, since they possess an excellent protective and curative activity against *Piricularia oryzae* in rice. In addition, the instant compounds can also be used for the control of further fungal pathogenic agents in rice and other cultivated plants. They possess a particular activity against the following species of fungi:

*Cochliobolus miyabeanus* species,
Mycosphaerella species,
Cerospora species,
Alternaria species,
Corticium species, and
Botrytis species.

Furthermore, the instant active compounds show a very good activity against fungi which attack the plant from the soil and some of which cause Tracheomycoses, such as

*Fusarium cubense,*
*Fusarium dianthi,*
*Verticillium alboatrum,* and
*Phialophora cinerescens.*

The active compounds according to the instant invention can be utilized, if desired, in the form of the usual formulations or compositions with diluents or extenders, i.e., dispersible carrier vehicles, such as solutions, emulsions, suspensions, emulsifiable concentrates, spray powders, pastes, soluble powders, dusting agents, granulates, etc. These are prepared in known manner, for instance by extending the active compounds with dispersible liquid diluent carriers and/or dispersible solid carriers optionally with the use of carrier vehicle assistants, e.g. surface-active agents, including emulsifying agents and/or dispersing agents, whereby, for example, in the case where water is used as diluent, organic solvents may be added as auxiliary solvents (cf. Agricultural Chemicals, March 1960, pages 35–38). The following may be chiefly considered for use as carrier vehicles for this purpose: dispersible liquid diluent carriers, such as aromatic hydrocarbons (e.g. benzene, toluene, xylene, etc.), halogenated, especially chlorinated, aromatic hydrocarbons (e.g. chlorobenzenes, etc.), paraffins (e.g. petroleum fractions), chlorinated aliphatic hydrocarbons (e.g. methylene chloride, etc.), alcohols (e.g. methanol, ethanol, propanol, butanol, etc.), amines (e.g. ethanolamine, etc.), ethers, ether-alcohols (e.g. glycol monomethyl ether, etc.), amides (e.g. dimethyl formamide, etc.), sulfoxides (e.g. dimethyl sulfoxide, etc.), ketones (e.g. acetone, etc.), and water; as well as dispersible finely divided solid carriers, such as ground natural minerals (e.g. kaolins, alumina, silica, chalk, i.e., calcium carbonate, talc, kieselguhr, etc.) and ground synthetic minerals (e.g. highly dispersed silicic acid, silicates, e.g. alkali silicates, etc.); whereas the following may be chiefly considered for use as carrier vehicle assistants, e.g. surface-active agents, for this purpose: emulsifying agents, such as non-ionic and anionic emulsifying agents (e.g. polyethylene oxide esters of fatty acids, polyethylene oxide ethers of fatty alcohols, alkyl sulfonates, aryl sulfonates, etc., and especially alkyl arylpolyglycol ethers, magnesium stearate, sodium oleate, etc.); and dispersing agents, such as lignin, sulfite waste liquors, methyl cellulose, etc.

Such active compounds may be employed alone or in the form or mixtures with one another and/or with such solid or liquid dispersible carrier vehicles and/or with other known compatible active agents, especially plant protection agents, such as other fungicides, herbicides, insecticides, bactericides, etc., if desired, or in the form of particular dosage preparations for specific application made therefrom, such as solutions, emulsions, suspensions, powders, pastes, and granulates which are thus ready for use.

As concerns commercially marketed preparations, these generally contemplate carrier composition mixtures in which the active compound is present in an amount substantially between about 0.1–95%, and preferably 0.5–90%, by weight of the mixture, whereas carrier composition mixtures suitable for direct application or field application generally contemplate those in which the active compound is present in an amount substantially between about 0.0001–20%, preferably 0.0005–5%, by weight of the mixture. Thus, the present invention contemplates over-all compositions which comprise mixtures of a dispersible carrier vehicle such as (1) a dispersible carrier solid, or (2) a dispersible carrier liquid preferably including a carrier vehicle assistant, e.g. surface-active agent, such as an emulsifying agent and/or a dispersing agent, and an amount of the active compound which is effective for the purpose in question and which is generally about 0.0001–95%, and preferably 0.0005–95%, by weight of the mixture.

In particular, the present invention contemplates methods of selectively controlling or combating fungi, which comprise applying to at least one of (a) such fungi and (b) their habitat, a fungicidally effective amount of the particular active compound of the invention alone or together with a carrier vehicle as noted above. The instant formulations or compositions are applied in the usual manner, for instance by spraying, atomizing, vaporizing, scattering, dusting, watering, sprinkling, pouring, and the like.

It will be realized, of course, that the concentration of the particular active compound utilized in admixture with the carrier vehicle will depend upon the intended application. Therefore, in special cases, it is possible to go above or below the aforementioned concentration ranges.

The outstanding fungitoxic effectiveness of the instant compounds as well as their distinct superiority compared with a known product of analogous constitution and the same type of activity, can be seen, by way of illustration and without limitation, from the following example:

EXAMPLE 1

Piricularia test: liquid preparation of active compound

Solvent—1 part by weight of acetone
Dispersing agent—0.05 part by weight of sodium oleate
Other additive—0.2 part by weight of gelatin
Water—98.75 parts by weight of $H_2O$ The amount of the particular active compound required for the desired concentration in the spray liquor is mixed with the stated amount of solvent, and the resulting concentrate is diluted with the stated amount of water containing the stated additive and dispersing agent.

(a) Test for protective action.—30 rice plants about 14 days old are sprayed with the spray liquor until dripping wet. The plants remain in a greenhouse at temperatures of 22 to 24° C. and a relative atmospheric humidity of about 70% until they are dry. They are then inoculated with an aqueous suspension of 100,000 to 200,000 spores/ ml. of *Piricularia oryzae* and placed in a chamber at 24–26° C. and 100% relative atmospheric humidity.

5 days after inoculation, the infestation of all the leaves present at the time of inoculation is determined as a percentage of the untreated but also inoculated control plants. 0% means no infestation; 100% means that the infestation is exactly as great in the case of the control plants. This test indicates the protective effect.

The particular active compounds tested, their concentrations and the results obtained can be seen from Table 1.

(b) Test for curative action.—The above test (a) is repeated, except that the active compounds are applied not before, but only 16 hours after, inoculation. Substances which show an activity when the test is conducted in this manner are in a position to kill the fungus after infection and thereby to exercise a curative action.

The results can also be seen from Table 1.

TABLE 1

| Active compound (constitution) | | Infestation as a percentage of the infestation of the untreated control with a concentration of active compound (in percent) of— | |
|---|---|---|---|
| | | 0.05 | 0.025 |
| (A) $(C_2H_5)_2N-\overset{O}{\underset{\|}{P}}(-S-\langle\text{phenyl}\rangle-CH_3)_2$ (known comparative preparation) | Protective action____ Curative action_____ | 0 96 | 50 |
| ($III_1$) $\langle H\rangle-O-\overset{O}{\underset{\|}{P}}\underset{S-\langle\rangle}{\overset{S-\langle\rangle}{}}$ | Protective action____ Curative action_____ | 0 0 | 0 |
| ($IV_1$) $\langle H\rangle-O-\overset{O}{\underset{\|}{P}}\underset{S-\langle\rangle-Cl}{\overset{S-\langle\rangle-Cl}{}}$ | Protective action____ | 0 | 22 |
| ($V_1$) $\langle H\rangle-O-\overset{O}{\underset{\|}{P}}\underset{S-\langle\rangle-CH_3}{\overset{S-\langle\rangle-CH_3}{}}$ | Protective action___ | 6 | 11 |

The process for producing the instant compounds is illustrated, without limitation, by the following further examples.

EXAMPLE 2

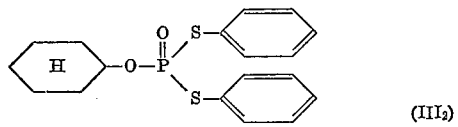

(III₂)

0.5 molar mixture:

110 g. (1 mol) of thiophenol are dissolved in 500 ml. of acetonitrile. To this solution are added 150 g. of dried potassium carbonate; and then 109 g. (0.5 mol) of O-cyclohexyl-phosphoric acid ester dichloride are added dropwise, with stirring. The mixture is then stirred for several hours, and 200 ml. of benzene are then added. The reaction mixture is then diluted with 300 ml. of water, and the benzene layer is separated and dried over sodium sulfate. After the benzene has been distilled off, 105 g. (57% of the theory) of O-cyclohexyl-S,S-diphenyl-dithiolphosphoric acid ester are obtained. The compound crystallizes from from ligroin in colorless needles of M.P. 65° C.

EXAMPLE 3

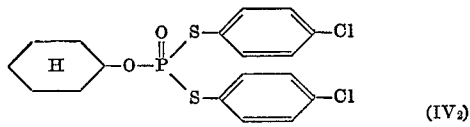

(IV₂)

0.5 molar mixture:

To a solution of 144 g. (1 mol.) of 4-chloro-thiophenol in 600 ml. of benzene there are added 102 g. of triethylamine; 108 g. (about 0.5 mol) of O-cyclohexyl-phosphoric acid ester dichloride are then added dropwise to the reaction mixture at 10 to 15° C., with stirring. The mixture is stirred for a further 4 hours at room temperature and poured into 400 ml. of ice water. The mixture is vigorously shaken, the aqueous phase is separated and, finally, the organic layer is dried over sodium sulfate. After the solvent has been distilled off under reduced pressure, there remains behind an oil which, when mixed with 150 ml. of cold petroleum ether, solidifies in crystalline form. 167 g. (77% of the theory) of O-cyclohexyl-S,S-bis(4-chloro-phenyl) - dithiol-phosphoric acid ester are obtained in the form of colorless crystal needles of melting point 84° C.

Analysis.—Calculated for a molecular weight of 433 (percent) P, 7.2; S, 14.8; Cl, 16.0. Found (percent): P, 7.3; S, 14.1; Cl 16.0.

EXAMPLE 4

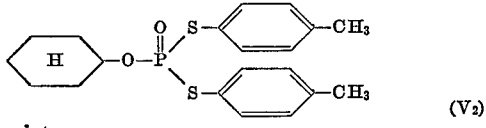

(V₂)

0.5 molar mixture:

124 g. (1 mol) of 4-thiocresol are dissolved in 600 ml. of benzene; 102 g. of triethylamine are added to this solution, and then 108 g. of O-cyclohexyl-phosphoric acid ester dichloride are added dropwise at 10 to 15° C., with stirring. Thereafter the mixture is stirred for a further 4 hours and then worked up as described in the preceding example, 143 g. of O-cyclohexyl-S,S - bis - (4 - methylphenyl)-dithiol-phosphoric acid ester are obtained in the form of colorless crystal needles of melting point 69° C.

Analysis.—Calculated for a molecular weight of 392 (percent): P, 7.9; S, 16.3. Found (percent): P, 8.1; 16.0.

EXAMPLE 5

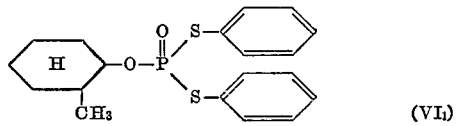

(VI₂)

0.8 molar mixture:

176 g. (1.6 mols) of thiophenol are dissolved in 1000 ml. of benzene. To this solution are added 163 g. of triethylamine; 188 g. (about 0.8 mol) of O-(2-methyl-cyclohexyl)-phosphoric acid ester dischloride are then added dropwise to the reaction mixture, with stirring, and the mixture is further stirred for several hours at room temperature. The precipitated triethylammonium hydrochloride is then filtered off with suction. The filtrate is washed once with water. The organic phase is dried over sodium sulfate and, finally, the solvent is evaporated under reduced pressure. In this way the O-(2-methyl-cyclohexyl-S,S-diphenyl-dithiol-phosphoric acid ester is obtained in the form of a pale yellow colored water-insoluble oil. The yield is 160 g. (53% of the theory).

Analysis.—Calculated for a molecular weight of 378 (percent): P, 8.2; S, 17.0. Found (percent): P, 7.7; S, 17.1.

The O-(2-methyl-cyclohexyl)-phosphoric acid ester dichloride of the formula

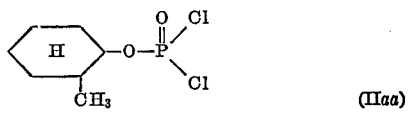

(IIaa)

can be prepared e.g. as follows—2 molar mixture:

To a solution of 308 g. of phosphorus oxychloride in 600 ml. of carbon tetrachloride there are added at 0 to 5° C., with stirring, 228 g. of 2-methyl-cyclohexanol dissolved in 100 ml. of carbon tetrachloride; the mixture is stirred for a further 2 hours at room temperature and the solvent is then carefully distilled off. There are obtained in this way 335 g. (73% of the theory) of O-(2-methyl-cyclohexyl)-phosphoric acid ester dichloride.

EXAMPLE 6

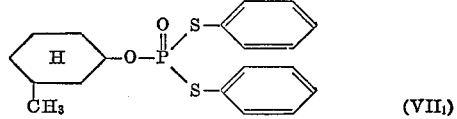

(VII₂)

0.8 molar mixture:

176 g. (1.6 mols) of thiophenol are dissolved in 1000 ml. of benzene; to this solution are added first 163 g. of triethylamine and then, dropwise and with stirring, at 15 ot 20° C., 188 g. (about 0.8 mol) of O-(3-methyl-cyclohexyl)-phosphoric acid ester dichloride. Thereafter the mixture is stirred for a further 4 hours, the precipitated triethylammonium hydrochloride is filtered off benzene solution is then dried over sodium sulfate and with suction and the filtrate is washed with water. The the solvent is evaporated under reduced pressure. In this way, 220 g. (73% of the theory) of O-(3-methyl-cyclohexyl)-S,S-diphenyl-dithio-phosphoric acid ester are obtained as slightly yellow, water-insoluble oil.

Analysis.—Calculated for a molecular weight of 378 (percent): P, 8.2; S, 17.0. Found (percent): 7.9; 17.2.

EXAMPLE 7

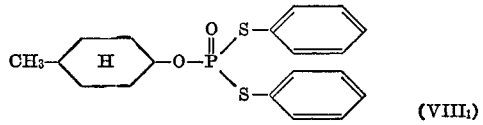

(VIII₂)

0.6 molar mixture:

132 g. (1.2 mols) of thiophenol are dissolved in 600 ml. of benzene. To this solution are added 123 g. of triethylamine; then 140 g. (about 0.6 mol) of O-(4-methyl-cyclohexyl)-phosphoric acid ester dichloride are added dropwise at 15 to 20° C., with stirring, and the mixture is further stirred for some hours and then worked up in the usual manner as noted above. There are so obtained 102 g. (45% of the theory) of O-(4-methyl-cyclohexyl)-S,S-diphenyl-dithio-phosphoric acid ester in the form of colorless crystals which melt at 65° C.

*Analysis.*—Calculated for a molecular weight of 378 (percent): P, 8.2; S, 16.9. Found (percent): P, 8.5; S, 17.2.

EXAMPLE 7

Using corresponding molar amounts of each of the following phosphoric acid monoester dichlorides with each of the following thiophenols, respectively, in accordance with the procedure of Example 2, as the case may be:

(a) O-(4-sec.-butyl-cyclohexyl)-phosphoric acid ester dichloride and 3,4-dibromo-thiophenol;

(b) O - (2,4,6 - tri-ethyl-cyclohexyl)-phosphoric acid ester dichloride and 3-fluoro-thiophenol; and (c) O-(3,5-dimethyl-cyclohexyl)-phosphoric acid dichloride and 2,4,6-tri-isobutyl-thiophenol;

the corresponding final products are produced:

(a′) O-(4-sec.-butyl-cyclohexyl)-S,S-bis-(3,4-dibromophenyl)-dithiol-phosphoric acid ester;

(b′) O-(2,4,6-tri-ethyl - cyclohexyl)-S,S-bis-(3-fluorophenyl)-dithiol-phosphoric acid ester; and (c′) O-(3,5 - dimethyl-cyclohexyl)-S,S-bis(2,4,6-triisobutyl-phenyl)-dithiol-phosphoric acid ester.

Advantageously, in accordance with the present invention, in the foregoing formulae:

R represents lower alkyl such as methyl, ethyl, n-propyl, isopropyl, n-butyl, isobutyl, sec.-butyl, tert.-butyl, n-amyl, and the like, especially methyl, ethyl, n-propyl, isopropyl, n-butyl, isobutyl, sec.-butyl, and n-amyl, and particularly $C_{1-5}$ alkyl, preferably methyl;

R′ represents halo such as chloro, bromo, iodo and fluoro, especially chloro, bromo and fluoro, and particularly chloro; or lower alkyl as defined above for R;

$m$ represents a whole number from 0 to 3, especially 0 to 1; and $n$ represents a whole number from 0 to 3, especially 0 to 1, with the corresponding R and R′ group contemplating ortho, meta and/or para substitution.

It will be realized by the artisan that all of the foregoing compounds contemplated by the present invention possess the desired strong fungicidal properties, with regard to a broad spectrum of activity, as well as a comparatively low toxicity toward warm-blooded creatures and a concomittantly low phytotoxicity, enabling such compounds to be used with correspondingly favorable compatibility with warm-blooded creatures and plants for more effective control and/or elimination of fungi by application of such compounds to such fungi and/or their habitat.

It will be appreciated that the instant specification and examples are set forth by way of illustration and not limitation, and that various modifications and changes may be made without departing from the spirit and scope of the present invention which is to be limited only by the scope of the appended claims.

What is claimed is:

1. Dithiol-phosphoric acid triester having the formula

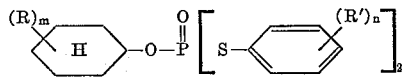

in which R is lower alkyl, R′ is selected from the group consisting of halo and lower alkyl, and $m$ and $n$ each respectively is a whole number from 0 to 3.

2. Triester according to claim 1 wherein R is alkyl having 1–5 carbon atoms, R′ is halo, and $m$ and $n$ each respectively is a whole number from 0 to 1.

3. Triester according to claim 1 wherein R is alkyl having 1–5 carbon atoms, R′ is alkyl having 1–5 carbon atoms, and $m$ and $n$ each respectively is a whole number from 0 to 1.

4. Triester according to claim 1 wherein R is methyl, R′ is selected from the group consisting of chloro and methyl, and $m$ and $n$ each respectively is a whole number from 0 to 1.

5. Triester according to claim 1 wherein such compound is O-cyclohexyl-S,S - diphenyl - dithiol-phosphoric acid ester having the formula

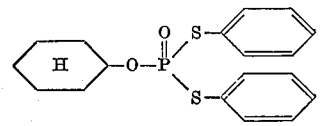

6. Triester according to claim 1 wherein such compound is O-cyclohexyl-S,S-bis-(4-chloro-phenyl)-dithiolphosphoric acid ester having the formula

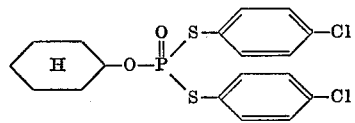

7. Triester according to claim 1 wherein such compound is O-cyclohexyl-S,S-bis-(4-methyl-phenyl)-dithiolphosphoric acid ester having the formula

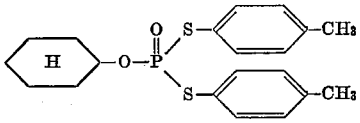

No references cited.

CHARLES B. PARKER, Primary Examiner

A. H. SUTTO, Assistant Examiner

U.S. Cl. X.R.

260—959, 973; 424—225